(12) United States Patent
Liu

(10) Patent No.: US 11,679,549 B2
(45) Date of Patent: Jun. 20, 2023

(54) ADDITIVE MANUFACTURING APPARATUS WITH CONTROLLER VARYING THE BEAM SHIFT OF A LASER BASED ON SLICE MODEL PARAMETERS OF BUILD OBJECT

(71) Applicant: AIRBUS (BEIJING) ENGINEERING CENTRE COMPANY LIMITED, Beijing (CN)

(72) Inventor: Ming Liu, Beijing (CN)

(73) Assignee: AIRBUS (BEIJING) ENGINEERING CENTRE COMPANY LIMITED, Beijing (CN)

( * ) Notice: Subject to any disclaimer, the term of this patent is extended or adjusted under 35 U.S.C. 154(b) by 0 days.

(21) Appl. No.: 17/177,794

(22) Filed: Feb. 17, 2021

(65) Prior Publication Data

US 2021/0252781 A1   Aug. 19, 2021

(30) Foreign Application Priority Data

Feb. 18, 2020   (CN) .......................... 202010099194.0

(51) Int. Cl.
*B29C 64/153*   (2017.01)
*B29C 64/321*   (2017.01)
(Continued)

(52) U.S. Cl.
CPC .......... *B29C 64/153* (2017.08); *B29C 64/135* (2017.08); *B29C 64/236* (2017.08);
(Continued)

(58) Field of Classification Search
None
See application file for complete search history.

(56) References Cited

U.S. PATENT DOCUMENTS

| | | | | |
|---|---|---|---|---|
| 5,228,583 A | * | 7/1993 | Weinstein | B65D 50/041 215/334 |
| 2002/0176255 A1 | * | 11/2002 | Yamauchi | H04N 9/3167 362/346 |

(Continued)

FOREIGN PATENT DOCUMENTS

| | | | | |
|---|---|---|---|---|
| CN | 106363171 A | * | 2/2017 | |
| CN | 105618755 B | | 5/2017 | |

(Continued)

*Primary Examiner* — Francisco W Tschen
*Assistant Examiner* — Guy F Mongelli
(74) *Attorney, Agent, or Firm* — Nixon & Vanderhye P.C.

(57) ABSTRACT

An additive manufacturing apparatus is disclosed including an additive manufacturing platform; a material feeding unit configured to feed a material onto the additive manufacturing platform; a laser generating unit configured to generate a laser beam with a linear light spot for projecting onto the material on the additive manufacturing platform; and a movement driving unit configured to drive at least one of the laser generating unit, the additive manufacturing platform and the material feeding unit to move in at least one direction. An additive manufacturing method is also disclosed. With the additive manufacturing apparatus and (Continued)

method, an additive manufacturing process can be performed efficiently, and are particularly suitable for an additive manufacturing process of large-size components.

13 Claims, 5 Drawing Sheets

(51) Int. Cl.
  *B29C 64/268*  (2017.01)
  *B29C 64/245*  (2017.01)
  *B29C 64/236*  (2017.01)
  *B29C 64/282*  (2017.01)
  *B29C 64/135*  (2017.01)
  *B29C 64/393*  (2017.01)
  *B33Y 50/02*  (2015.01)
  *B33Y 10/00*  (2015.01)
  *B33Y 30/00*  (2015.01)
  *B33Y 40/00*  (2020.01)

(52) U.S. Cl.
  CPC .......... *B29C 64/245* (2017.08); *B29C 64/268* (2017.08); *B29C 64/282* (2017.08); *B29C 64/321* (2017.08); *B29C 64/393* (2017.08); *B33Y 10/00* (2014.12); *B33Y 30/00* (2014.12); *B33Y 40/00* (2014.12); *B33Y 50/02* (2014.12)

(56) References Cited

U.S. PATENT DOCUMENTS

| | | | | |
|---|---|---|---|---|
| 2004/0223330 | A1* | 11/2004 | Broude | G03F 7/70075 |
| | | | | 362/268 |
| 2007/0097323 | A1* | 5/2007 | Otis | H04N 5/7416 |
| | | | | 348/E9.026 |
| 2009/0168450 | A1* | 7/2009 | Okamoto | G03B 21/2073 |
| | | | | 362/559 |
| 2015/0266237 | A1* | 9/2015 | Comb | G03G 15/24 |
| | | | | 264/401 |
| 2018/0200834 | A1 | 7/2018 | Kilmer et al. | |
| 2019/0369406 | A1* | 12/2019 | Palumbo | G02B 27/10 |

FOREIGN PATENT DOCUMENTS

| | | | |
|---|---|---|---|
| CN | 106975750 A | * | 7/2017 |
| CN | 107900335 A | | 4/2018 |
| CN | 107971490 A | | 5/2018 |
| CN | 208004801 U | | 10/2018 |
| CN | 106273497 B | | 2/2019 |
| CN | 108356268 B | | 3/2019 |
| EP | 2691197 | | 2/2014 |
| EP | 3016764 | | 5/2016 |
| KR | 10-20160003521 A | | 1/2016 |
| WO | 2012/134299 | | 10/2012 |
| WO | 2015/001241 | | 1/2015 |

* cited by examiner

ADDITIVE MANUFACTURING APPARATUS WITH CONTROLLER VARYING THE BEAM SHIFT OF A LASER BASED ON SLICE MODEL PARAMETERS OF BUILD OBJECT

CROSS REFERENCE TO RELATED APPLICATION

This application claims priority to Chinese Patent Application Number CN 202010099194-0, filed Feb. 18, 2020, the entire contents of which is hereby incorporated by reference.

FIELD OF THE INVENTION

The present application relates to the technical field of material processing and, in particular, to an additive manufacturing method and an additive manufacturing apparatus with which a product is formed by performing an additive manufacturing process using laser light, and a computer-readable medium on which a program for performing the additive manufacturing method is stored.

BACKGROUND OF THE INVENTION

A laser additive manufacturing technology is a technology for manufacturing a solid part by using a laser as a heat source to melt and stack materials such as powder materials layer by layer, which includes, for example, a selective Laser Sintering technology and Stereolithography technology. Beam stability and light spot quality of a laser are important factors for precision manufacturing. It is generally considered that, in order to realize a uniform light intensity distribution on a projection surface of the laser beam, a circular or oval light spot (which is referred to herein as a "point light spot") is advantageous and the dimension of such a light spot is small. Thus, the laser additive manufacturing technology is commonly used to manufacture small batches of components or micro-components.

However, large-scale integral metal members are increasingly used in various fields, especially in aviation, aerospace, ships and the like. For example, large-scale monolithic titanium alloy structures have become a major trend in the development of aircrafts. With the existing additive manufacturing method using a laser beam of a point light spot, a very long time is required for forming a large-size component. For example, when a member of 400 mm×400 mm×400 mm is to be 3D-printed with the selective laser sintering technology, about 10 days is required for forming the member. It can be seen that, the laser additive technology has a low efficiency, a high cost, a long cycle when manufacturing a large-size component, and thermal deformation and a thermal stress of the product may also be caused. The thermal deformation and thermal stress accumulated in the long-term additive manufacturing process will greatly limit the application of the laser as a forming heat source or a trigger energy source in the additive manufacturing technology, especially the application of the laser in the additive manufacturing technology for a large-size component.

It is a problem desired to be solved for a long term how to improve the efficiency, reduce the cost, and ensure the quality of a large-size component formed with the laser additive manufacturing technology. This is because there are many factors to hinder the development of the laser additive manufacturing technology on large-size component, e.g. complex designs of an optical system and a computer algorithm, adaptive changes in additive manufacturing process, and the like.

SUMMARY OF THE INVENTION

An object of the present application is to provide an additive manufacturing method and an additive manufacturing apparatus, with which a laser is used as a heat source and an additive manufacturing process can be performed efficiently. The additive manufacturing method and the additive manufacturing apparatus are particularly suitable for efficiently manufacturing a large-size component.

According to an aspect of the present application, an additive manufacturing apparatus is provided. The additive manufacturing apparatus includes: an additive manufacturing platform, a material feeding unit, a laser generating unit and a movement driving unit. The material feeding unit is configured to feed a material onto the additive manufacturing platform. The laser generating unit is configured to generate a laser beam with a linear light spot for projecting on the material on the additive manufacturing platform. The movement driving unit is configured to drive at least one of the laser generating unit, the additive manufacturing platform and the material feeding unit to move or rotate in at least one direction.

In the additive manufacturing apparatus of the present application, the laser generating unit projects a linear light spot on a material. The "linear light spot" mentioned herein refers to a light spot with a large difference in two dimensions respectively along two directions perpendicular to each other on a projection plane parallel to the additive manufacturing platform, which is different from a light spot (the two dimensions of which in the two directions perpendicular to each other are basically the same or have little difference) such as a circular light spot or an oval light spot. In a case that a direction of a larger dimension of the light spot is approximately perpendicular to a direction of a relative movement between the laser beam and the material, the scanning area of the linear light spot is significantly larger than the scanning area of the point light spot at the same speed of movement, which can significantly increase the additive manufacturing efficiency and reduce the manufacturing costs and cycle. When the direction of the larger dimension of the light spot is approximately parallel to the direction of relative movement between the laser beam and the material, the surface of the material irradiated by a front part of the linear light spot is then irradiated by the middle or rear parts of the linear light spot. Therefore, in order to realize a basically uniform light intensity distribution on the surface of the material, the scanning speed of the laser beam may be increased, for example, increased by at least 3 times, which in turn significantly increase the additive manufacturing efficiency and reduce the manufacturing cost and cycle. As such, the additive manufacturing apparatus according to the present application is particularly suitable for an additive manufacturing process for a large-size component.

In some examples of the additive manufacturing apparatus, the laser generating unit includes a light spot converting device configured to convert a point light spot into the linear light spot. A known laser generator capable of generating a point light spot may be used to generate a laser beam with a point light spot, and then the point light spot is converted into a linear light spot by the light spot converting device before the laser beam reaches the material. In this way, the cost of the additive manufacturing apparatus of the present application can be significantly reduced.

In some examples of the additive manufacturing apparatus, the linear light spot has a first dimension L and a second dimension W respectively in two directions perpendicular to each other on a projection plane parallel to the additive manufacturing platform. A dimension ratio L/W of the first dimension L to the second dimension W ranges from 3 to 50.

In some examples of the additive manufacturing apparatus, the laser generating unit includes a real-time operating device configured to change a parameter of the linear light spot in real time. For example, during the additive manufacturing process, the dimension ratio of the linear light spot may be changed in real time by the real-time operating device, so that the additive manufacturing apparatus of the present application is suitable for the additive manufacturing process of products having various structures or dimensions. Therefore, the additive manufacturing apparatus according to the present application is applied widely and flexibly.

In some examples of the additive manufacturing apparatus, the real-time operating device is configured to control a real-time change of the parameter of the linear light spot based on slice model data of each material layer stored in the control unit or based on the material, a thickness of the material layer and a laser power.

In some examples of the additive manufacturing apparatus, the light spot converting device includes: an optical beam expanding system configured to one-dimensionally expand a laser beam generated by a laser into a linear beam; an optical splitting and rearranging system configured to split or rearrange the laser beam expanded by the optical beam expanding system; and a prismatic lens focusing system configured to focus a split and rearranged laser beam into the linear light spot by a prismatic lens.

In some examples of the additive manufacturing apparatus, the additive manufacturing apparatus further includes a heating unit configured to heat the material and/or the additive manufacturing platform. With the additive manufacturing apparatus according to the present application, by heating the material and/or the additive manufacturing platform, the heating rate of the material by the laser beam or the cooling rate of the material after the laser beam is removed can be reduced, which can improve the quality of a printed product.

In some examples of the additive manufacturing apparatus, the additive manufacturing apparatus is suitable for a selective laser sintering method or a stereolithography method. Additionally or alternatively, the laser light generated by the laser generating unit has a wavelength of 100 nm to 1500 nm.

According to another aspect of the present application, an additive manufacturing method is provided. The additive manufacturing method includes: feeding, by a material feeding unit, a material onto an additive manufacturing platform; generating, by a laser generating unit, a laser beam with a linear light spot for projecting on the material; and driving, by a movement driving unit, at least one of the laser generating unit, the additive manufacturing platform, and the material feeding unit to move or rotate in at least one direction during an additive manufacturing process.

In some examples of the additive manufacturing method, the generating the laser beam includes: generating a point light spot and converting, by a light spot converting device, the point light spot into a linear light spot.

In some examples of the additive manufacturing method, the linear light spot has a first dimension L and a second dimension W respectively in two directions perpendicular to each other on a projection plane parallel to the additive manufacturing platform, and a dimension ratio L/W of the first dimension L to the second dimension W ranges from 3 to 50.

In some examples of the additive manufacturing method, a parameter of the linear light spot is changed in real time by a real-time operating device during the additive manufacturing process.

In some examples of the additive manufacturing method, the real-time operating device is configured to control a real-time change of the parameter of the linear light spot based on slice model data of each material layer stored in the control unit or based on the material, a thickness of the material layer and a laser power.

In some examples of the additive manufacturing method, the light spot converting device includes: an optical beam expanding system configured to one-dimensionally expand a laser beam generated by a laser into a linear beam; an optical splitting and rearranging system configured to split and rearrange the laser beam expanded by the optical beam expanding system; and a cylindrical lens focusing system configured to focus a split and rearranged laser beam into the linear light spot by a cylindrical lens.

In some examples of the additive manufacturing method, the material and/or the additive manufacturing platform is heated by a heating unit.

In some examples of the additive manufacturing method, the additive manufacturing method is a selective laser sintering method or a stereolithography method. Additionally or alternatively, the laser light generated by the laser generating unit has a wavelength of 100 nm to 1500 nm.

The additive manufacturing method according to the present application may have the same or similar technical effects as the above-described additive manufacturing apparatus.

According to another aspect of the present application, a computer-readable medium is provided. A program is stored on the computer-readable medium, and the program, when being executed by a processor of a control unit, causes the processor to perform the additive manufacturing method described above.

Other advantages and features of the present application will become apparent in the following non-limiting detailed description.

BRIEF DESCRIPTION OF THE DRAWINGS

Features and advantages of one or more embodiments of the present application will become more readily understood through the following description with reference to the drawings. In the drawings.

Throughout the drawings, corresponding reference numerals indicate corresponding parts.

DETAILED DESCRIPTION

Figure 1:
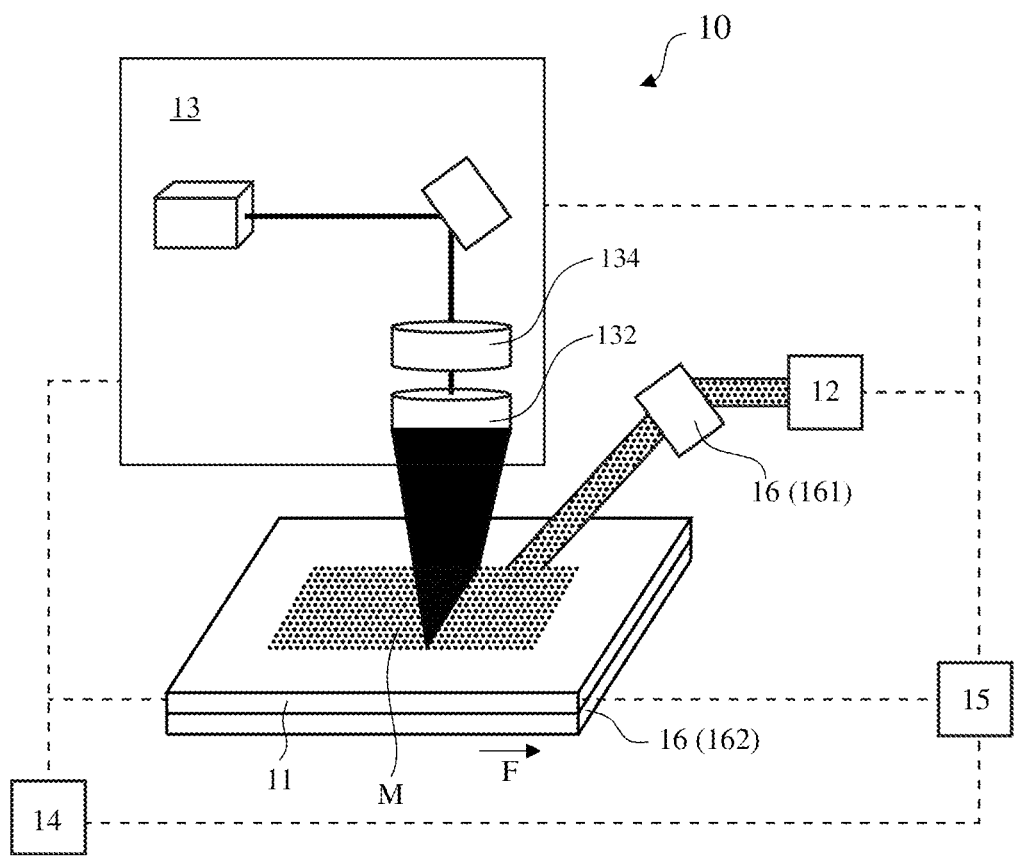
FIG. 1 is a schematic structural diagram of a selective laser melting additive manufacturing apparatus according to an embodiment of the present application.

The present application will be described in detail below by means of exemplary embodiments with reference to the drawings. The following detailed description of the present application is for illustrative purposes only, and is in no way a limitation to the present application and its applications or uses.

The terms "first", "second", "third", and the like are used herein to describe individual elements, components, regions, layers and/or sections, but these elements, components, regions, layers and/or sections should not be limited by these terms. These terms may be used only to distinguish one element, component, region, layer or section from another element, component, region, layer or section. Terms such as "first," "second," and other numerical terms do not imply a sequence or an order unless clearly indicated in the context. Thus, a first element, component, region, layer or section discussed below may be referred to as a second element, component, region, layer or section without departing from the teachings of the exemplary configurations.

In the description of the present application, it should be understood that the terms "up", "down", "front", "rear" and the like indicating the orientation or position relationship indicate the orientation or position relationship shown in the drawings. This is only for the convenience of describing the present application and simplifying the description, and does not indicate or imply that the device or element referred to must have a specific orientation, be constructed and operated in a specific orientation. Therefore, these terms cannot be understood as a limitation to the present application.

FIG. 1 is a schematic structural diagram of an additive manufacturing apparatus according to an embodiment of the present application. As shown in FIG. 1, an additive manufacturing apparatus 10 includes an additive manufacturing platform 11, a material feeding unit 12, a laser generating unit 13, a movement driving unit 14, a control unit 15 and a heating unit 16.

Figure 2:
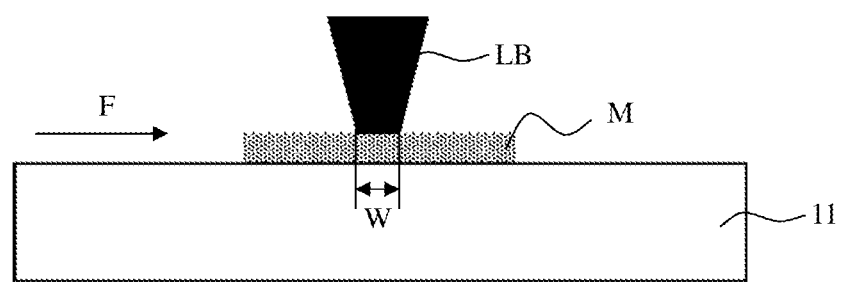
FIG. 2 is a schematic diagram showing a laser beam of the additive manufacturing apparatus in FIG. 1 which is irradiated on a workpiece.

The additive manufacturing platform 11 is a working station for performing an additive manufacturing process of a product. The material feeding unit 12 feeds a material M (as shown in FIG. 2) to the additive manufacturing platform 11, and a product is formed on the additive manufacturing platform 11 by the additive manufacturing process. A working surface of the additive manufacturing platform 11 on which the material is to be applied may be a flat surface (as shown in FIG. 2) or a surface having a structure (for example, a concave-convex structure) matching with a structure of the product.

The material feeding unit 12 may feed a powder material, a liquid material, a slurry material, or a material of any other suitable form onto the additive manufacturing platform 11 at a certain rate. The material feeding unit 12 may be, for example, a selective laser melting device for feeding a metal or plastic material or a stereolithography device for feeding a liquid or slurry material. For example, the material feeding unit 12 may be a roller material feeding unit. The material feeding unit 12 may feed at least one material, for example, a mixture of metal powders, or a mixture of plastic powders.

The heating unit 16 may heat the material M (for example, a metal material) and/or preserve heat for the material M before, during or after the additive manufacturing process. As shown in FIG. 1, the heating unit 16 may include a heater 161 configured to heat the material M during the process of feeding the material M from the material feeding unit 12 to the additive manufacturing platform 11. The heating unit 16 may further include a heater 162 configured to heat the additive manufacturing platform 11. Further, the additive manufacturing platform 11 may transfer the heat to the material M applied thereon, so that the temperature of the material M is increased in advance. The heaters 161 and/or 162 each may be, for example, a thermocouple heater or an electromagnetic heater.

The heaters 161 and/or 162 may heat the material M to a predetermined temperature and/or maintain the material M at a predetermined temperature. When a laser beam is irradiated on the material for additive manufacturing, the temperature gradient of the material during a heating process and a cooling process may be reduced, thereby reducing heating and cooling rates of the material. The product thus formed has a uniform structure and a moderate grain size, which improves the quality of the product.

It should be understood that the heating temperature may be set based on the type of materials, process parameters and the like. For example, during an additive manufacturing process of a titanium alloy, the heating temperature may reach 150° C. to 300° C. It should also be understood that the heating unit 16 may be omitted, for example, in an apparatus for performing an additive manufacturing process on a resin material or a ceramic material.

The movement driving unit 14 is configured to drive at least one of the additive manufacturing platform 11, the material feeding unit 12, and the laser generating unit 13 to move in at least one direction, including translation, rotation, tilt and the like. In an example, the movement driving unit 14 may drive a laser beam LB to move. In another example, the movement driving unit 14 may drive a nozzle of the material feeding unit 12 for feeding a material onto the additive manufacturing platform 11 to move. In the embodiment shown in FIG. 1, the movement driving unit 14 is configured to drive the laser generating unit 13 and the additive manufacturing platform 11 both to move. It should be understood that the movement driving unit 14 may drive any combination of the additive manufacturing platform 11, the material feeding unit 12 and the laser generating unit 13 as needed.

The control unit 15 is configured to communicate with various parts of the additive manufacturing apparatus 10 and control the various parts to realize their respective functions. Slice model data of a profiled product may be stored in a memory of the control unit 15 in advance. When the additive manufacturing apparatus starts to work, the control unit controls the various parts according to the model data stored in the memory, and cooperates with the parts to complete the processing of the product.

The laser generating unit 13 is configured to generate a laser beam LB (as shown in FIG. 2) to be irradiated onto the material. The materials is melted and bonded under the laser beam LB so as to form a product. The laser beam generated by the laser generating unit 13 may have a wavelength of 100 nm to 1500 nm.

Figure 3:
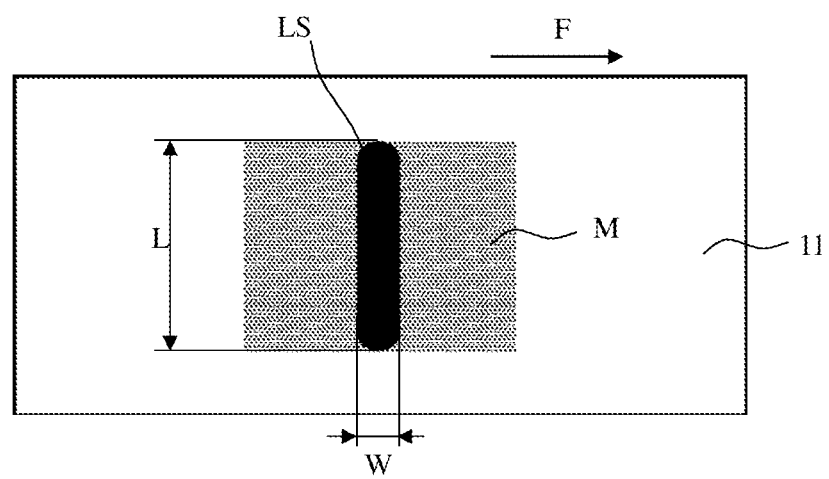
FIG. 3 is a schematic plan view of FIG. 2, where a linear light spot of a laser beam is shown in an enlarged manner.

Referring to FIGS. 2 and 3, the laser beam LB scans on the material along a movement direction F. A light spot of the laser beam LB projected on the material M has an elongated shape, which is referred to herein as a linear light spot LS. In the illustrated example, the linear light spot LS has a length (a first dimension) L and a width (a second dimension) W. The length L is significantly greater than the width W, thus the linear light spot LS has an elongated shape. A ratio of the length L to the width W may range from 3 to 50.

In the example of FIGS. 2 and 3, for the purpose of illustration, the material M is spreaded out in a rectangular shape. The linear light spot LS is substantially perpendicular to the movement direction F, that is, the length L of the linear light spot LS is substantially perpendicular to the movement direction F and the width W of the linear light spot LS is substantially parallel to the movement direction F. The length L of the linear light spot LS is substantially equal to the width of a layer of the material M. When the laser beam LB scans along the movement direction F, given that the light intensity per unit area is sufficient, it is only required to scan once. Apparently, with the additive manufacturing apparatus 10 of the present application, the work efficiency is improved greatly and the manufacturing cost and cycle are reduced. Even if the light intensity per unit area is insufficient, the laser beam LB may scan back and forth twice or more, which can also improve the working efficiency of the additive manufacturing apparatus 10. In addition, in a case that the laser beam LB scans back and forth, the power requirement on the laser generating unit 13 can also be reduced.

Figure 4:
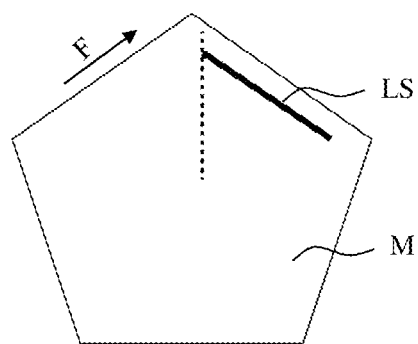
FIG. 4 is a schematic diagram of scanning a material layer having a different structure by using the linear light spot.

It should be understood that the shape of the material layer may be changed as needed, and the linear light spot LS may be in any suitable orientation with respect to the movement direction L. In an example as shown in FIG. 4, the material layer has a pentagonal shape. The laser beam LB moves in the movement direction F parallel to one side of the material layer. However, the linear light spot LS is parallel to an adjacent side of the material M layer and is not perpendicular to the movement direction L.

In an example not shown, the linear light spot LS may be parallel to the movement direction L, that is, the length L of the linear light spot LS is substantially parallel to the movement direction F and the width W of the linear light spot LS is substantially perpendicular to the movement direction F. When the laser beam LB scans along the movement direction L, a surface of the material irradiated by a front part of the linear light spot LS is then irradiated further by a middle or rear part of the linear light spot LS. In this case, the scanning speed of the laser beam LB may be increased, for example, increased by at least 2 times, so that the additive manufacturing efficiency can be significantly improved, and the manufacturing cost and cycle can be reduced.

It should also be understood that the laser beam LB may scan along any suitable scanning path, for example, reciprocating scanning, partially repeated scanning, interlaced scanning or the like.

Figure 5:
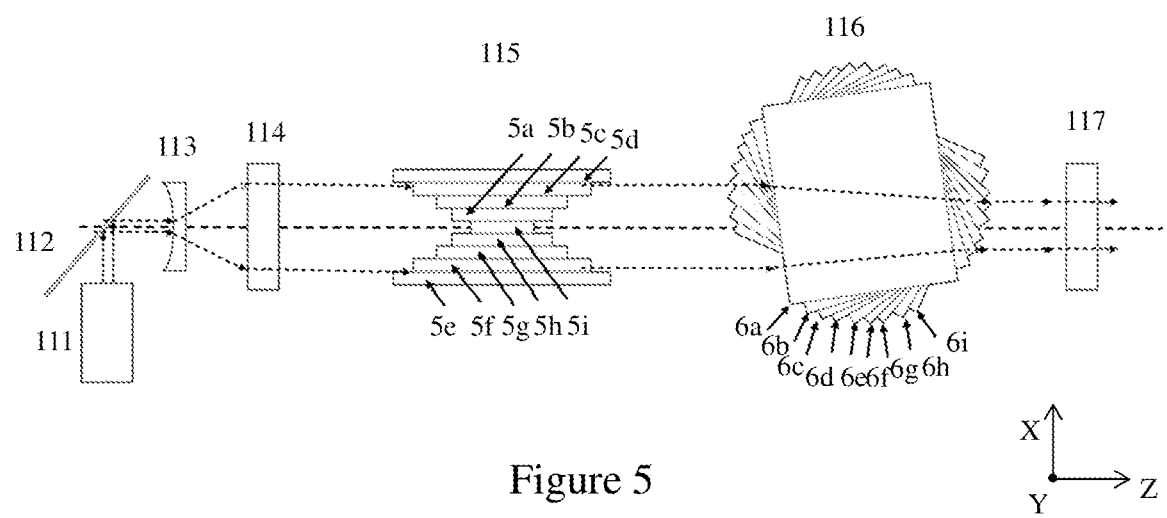
FIG. 5 shows an example of a laser generating unit according to an embodiment of the present application.

FIG. 5 shows an example of a laser generating unit 13 according to an embodiment of the present application, in which a point light source generated by a laser can be shaped into a linear light source. As shown in FIG. 5, the laser generating unit 13 includes a laser 111, a reflecting mirror 112, a concave lens 113, a convex lens 114, an X-direction parallel glass group 115, a Y-direction parallel glass group 116 and a prismatic lens group 117.

The laser 111 is, for example, a light source for generating a Gaussian point light spot. The laser generating unit in this example is a device that shapes a point light spot into a uniform linear light spot with an integral optical shaping method. A laser beam with the point light spot generated by the laser 111 is reflected the reflecting mirror 112 and then turned to a horizontal direction. It should be understood that, as needed, the laser generating unit 13 may have multiple mirrors or the mirrors may be omitted.

The laser beam with a point light spot reflected by the reflecting mirror 112 is converted into a laser beam with a linear light spot by a light spot converting device 132 (as shown in FIG. 1). The light spot converting device 132 includes the concave lens 113, the convex lens 114, the X-direction parallel glass group 115, the Y-direction parallel glass group 116 and the prismatic lens group 117. The concave lens 113 and the convex lens 114 constitute an optical beam expanding system for one-dimensionally expanding the laser beam into a linear beam. The X-direction parallel glass group 115 and the Y-direction parallel glass group 116 constitute an optical splitting and rearranging system for splitting and rearranging the laser beam expanded by the optical beam expanding system. The prismatic lens group 117 constitutes a prismatic lens focusing system.

The optical beam expanding system is configured to expand the laser beam into a linear beam in one-dimensional direction (the X direction or the Y direction). In an example as shown in FIG. 5, the laser beam generated by the laser 111 is expanded in the X direction through the concave lens 113 and the convex lens 114, thereby forming a linear beam in the X direction.

The splitting and rearranging system is configured to improve the performance (for example, uniformity) of a linear beam and improve the quality of the linear beam. The linear light spot of the laser beam can have different orientations and/or different sizes, depending on the setting of orientations of X and/or Y-direction parallel glasses of the splitting and rearranging system. The number of the parallel glasses in the X-direction parallel glass group 115 and the Y-direction parallel glass group 116 are each equal to or greater than three, and preferably equal to an odd number. A larger number of parallel glasses can lead to a higher accuracy in splitting and rearranging the expanded laser beam.

The point light spot generated by the laser 111 is expanded one-dimensionally, then is split and rearranged, and finally is focused by a prismatic lens into a uniform linear light spot. The point light spot is incident into the X-direction parallel glass group 115 after being expanded by the optical beam expanding system and stacked in the X direction, then is rotated by an angle around the X axis to realize the splitting of the laser beam by each parallel glass. The split beam is incident into the Y-direction parallel glass group 116, and is rotated by an angle around the Y axis to realize the rearrangement of the laser beam by each parallel glass.

The laser beam split and rearranged by the optical splitting and rearranging system finally is incident into the prismatic lens focusing system. The beam may be focused in the Y direction and then is irradiated on the material. Generally, the beam after being split and rearranged has an elongated elliptical light spot, which is then focused into a linear light spot as described herein after passing through the prismatic lens group 117.

The additive manufacturing apparatus 10 according to the present application may further includes a real-time operating device 134 (as shown in FIG. 1) configured to change a parameter of the linear light spot LS (for example, the first dimension L, the second dimension W, and the dimension ratio L/W) in real time during the additive manufacturing process. For example, the real-time operating device 134 may be configured to control a real-time change of at least one of the first dimension L, the second dimension W, and the dimension ratio L/W according to slice model data of each material layer stored in the control unit 15. In an alternative embodiment, the real-time operating device 134 may be configured to control a real-time change of at least one of the first dimension L, the second dimension W, and the dimension ratio L/W according to the material, a thickness of the material layer, a laser power, etc.

Figure 6:
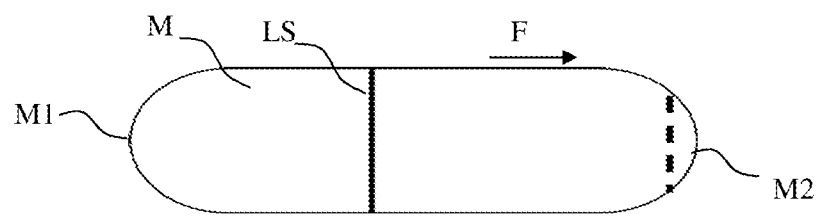
FIG. 6 is a schematic diagram of changing a dimension of a linear light spot of a laser beam during an additive manufacturing process.

As shown in FIG. 6, the layer of the material M has two arc-shaped opposite ends M1 and M2. As the linear light spot LS moves to the end M2 in the movement direction L, the length of the linear light spot LS decreases with the shape of the end M2, as shown by the dotted line in FIG. 6. In the example of FIG. 6, the width of the linear light spot LS is substantially unchanged. However, it should be understood that the width, the orientation, the dimension ratio L/W and the like of the linear light spot LS may be changed in real time as needed.

Figure 7:
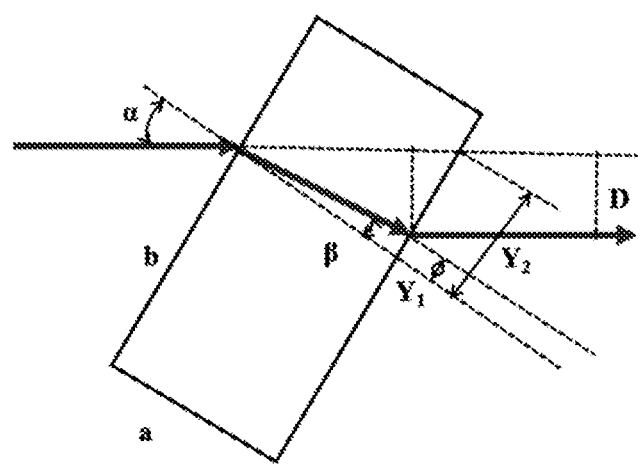
FIG. 7 is a schematic diagram showing an optical principle for changing a dimension of a linear light spot.

FIG. 7 is a schematic diagram showing the optical principle for changing the dimension of the linear light spot. The dimension of the linear light spot is related to the arrangement of the X-direction parallel glasses and the Y-direction parallel glasses shown in FIG. 5. FIG. 7 exemplarily shows an arrangement of one of the glass plates related to the first dimension L of the linear light spot.

As shown in FIG. 7, a represents an incident angle and also represents an rotation angle of the parallel glass; $\beta$ represents a refraction angle; a represents a width of a flat glass; b represents a length of the glass; and c represents a thickness of the glass (not shown); n represents a refractive index of the glass; and D represents a beam shift value of the glass. The beam shift value D may be obtained by the following equation:

$$D = (Y_2 - Y_1)\cos \alpha = a(\tan \alpha - \tan \beta)\cos \alpha = a \sin \alpha \left[1 - \sqrt{\frac{1 - \sin^2 \alpha}{n^2 - \sin^2 \alpha}}\right]$$

In a case that the number of the glasses is N, the beam shift values of the glasses are respectively represented by D1, D2, . . . , DN. The first dimension L of the linear light spot after passing through the glass group is equal to the sum of these beam shift values, that is, L=D1+D2+ . . . +DN.

The dimensions of the linear light spot in the X and Y directions may be adjusted by changing the beam expansion of a point light spot in the X and Y directions and then splitting and rearranging the expanded beam, that is, the range of L/W is adjustable. As the influence factors of D in the above equation, the value of D may be changed by changing any one of the incident angle, the refraction index of the glass, and the length of the glass.

In addition, in an actual application, it should be ensured that the split beams do not overlap with and separated from each other, and that all rearranged beams are in a straight line. Generally, a larger number of split beams can lead to a more uniform light spot.

Figure 8:
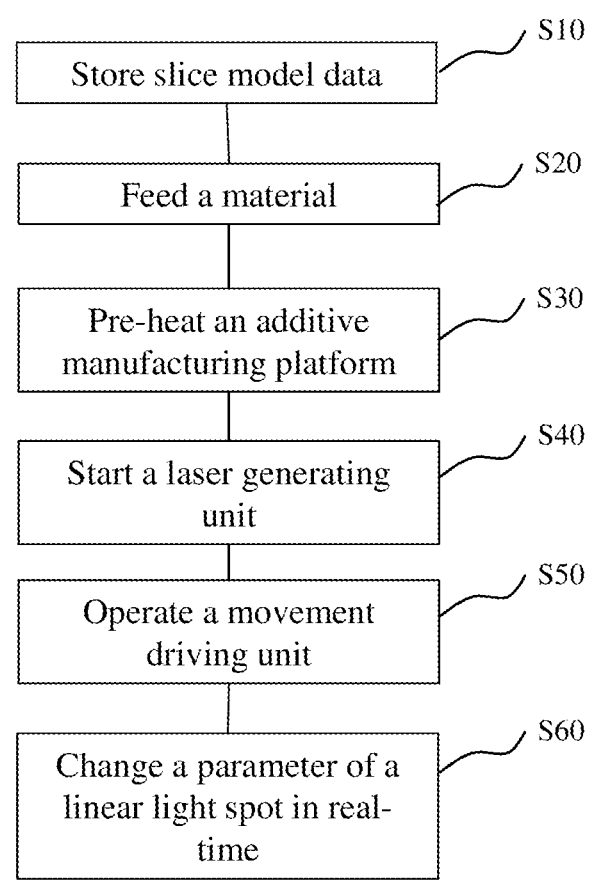
FIG. 8 is a schematic flowchart of an additive manufacturing method according to an embodiment of the present application.

Next, an additive manufacturing method performed by the additive manufacturing apparatus 10 according to the present application will be described with reference to FIG. 8. As shown in FIG. 8, the additive manufacturing method according to the present application includes: storing slice model data of a product to be formed in a memory of the control unit 15 in advance (step S10); feeding, by the material feeding unit 12, the material M onto the additive manufacturing platform 11 (step S20); heating the additive manufacturing platform 11 by the heating unit 16 (step S30); generating a laser beam LB by the laser generating unit 13, where the laser beam LB is projected on the material M with a linear light spot LS (step S40); during an additive manufacturing process, driving the laser beam LB to scan on the material M by the movement driving unit 14 (step S50); and changing a parameter of the linear light spot LS, such as the dimension, the orientation, the light intensity, the movement direction and the like in real time (step S60).

FIG. 8 shows only one example of the additive manufacturing method according to the present application. It should be understood that the present application is not limited to the specific example shown in FIG. 8. In a case that the method steps are not contradictory, the performing order of some steps may be changed, or a step may be omitted, or other steps may be added. For example, in step S20, the material M may be heated while feeding the material M. In this case, step S30 may be omitted.

The additive manufacturing method according to the present application may be, for example, a selective laser sintering method, a stereolithography method, or any other suitable alternative method.

The additive manufacturing apparatus and the additive manufacturing method described herein may be implemented by one or more computer programs executed by one or more processors. The computer program includes processor-executable instructions stored on a non-transitory tangible computer-readable medium. The computer program may also include stored data. Non-limiting examples of the non-transitory tangible computer-readable medium include a non-volatile memory, a magnetic storage device, and an optical storage device.

The term "computer-readable medium" does not include transient electrical or electromagnetic signals transmitted via a medium (such as via a carrier wave). The term "computer-readable medium" may therefore be considered as tangible and non-transitory. Non-limiting examples of the non-transitory tangible computer-readable medium include a non-volatile memory circuit (such as a flash circuit, an erasable programmable read-only memory circuit, or a mask read-only memory circuit), a volatile memory circuit (such as a static random access memory circuit or a dynamic random access memory circuit), a magnetic storage medium (such as analog or digital magnetic tapes or a hard driver), and an optical storage medium (such as a CD, a DVD, or a Blu-ray disc).

Although the present application has been described with reference to exemplary embodiments, it should be understood that the present application is not limited to the specific embodiments/examples described and illustrated in detail herein. Various modifications may be made to the exemplary embodiments by those skilled in the art without departing from the scope defined by the claims.

The invention claimed is:

1. An additive manufacturing apparatus, comprising:
an additive manufacturing platform;
a material feeding unit configured to feed a material (M) onto the additive manufacturing platform;
a laser generating unit configured to generate a laser beam with a linear light spot for projecting on the material on the additive manufacturing platform;
a movement driving unit configured to drive at least one of the laser generating unit, the additive manufacturing platform and the material feeding unit to move in at least one direction;
a control unit configured to vary the laser generating to change a parameter of the linear light spot in real time; and, a heating unit configured to heat the material and/or the additive manufacturing platform, wherein the parameter is based on slice model data of each material layer stored in the control unit, or based on the material, a thickness of the material layer or a laser power, wherein the parameter is a beam shift value obtained by the following equation:

$$D = a\sin\alpha\left(1 - \sqrt{\frac{1-(\sin\alpha)^2}{n^2-(\sin\alpha)^2}}\right)$$

wherein α represents an incident angle; β represents a refraction angle; a represents a width of a flat glass; and c represents the thickness of the material layer; n represents a refractive index of the glass; and D represents the beam shift value of the glass.

2. The additive manufacturing apparatus according to claim 1, wherein
the laser generating unit comprises a light spot converting device configured to convert a point light spot into the linear light spot.

3. The additive manufacturing apparatus according to claim 2, wherein
the light spot converting device comprises:
an optical beam expanding system configured to one-dimensionally expand a laser beam generated by a laser into a linear beam;
an optical splitting and rearranging system configured to split and rearrange the laser beam expanded by the optical beam expanding system; and
a prismatic lens focusing system configured to focus a split and rearranged laser beam into the linear light spot by a prismatic lens.

4. The additive manufacturing apparatus according to claim 1, wherein:
the control unit is configured to vary the linear light spot having a first dimension L and a second dimension W respectively in two directions perpendicular to each other on a projection plane parallel to the additive manufacturing platform, and a dimension ratio L/W of the first dimension L to the second dimension W ranges from 3 to 50.

5. The additive manufacturing apparatus according to claim 1, wherein:
the additive manufacturing apparatus is suitable for a selective laser sintering method or a stereolithography method; and/or
a laser light generated by the laser generating unit has a wavelength of 100 nm to 1500 nm.

6. An additive manufacturing method using the additive manufacturing apparatus of claim 1, comprising:
feeding, by a material feeding unit, a material onto an additive manufacturing platform;
generating, by a laser generating unit, a laser beam with a linear light spot for projecting on the material; and driving, by a movement driving unit, at least one of the laser generating unit, the additive manufacturing platform and the material feeding unit to move in at least one direction during an additive manufacturing process.

7. The additive manufacturing method according to claim 6, wherein:
the additive manufacturing method is a selective laser sintering method or a stereolithography method; and/or
the additive manufacturing method further comprises heating the material and/or the additive manufacturing platform by a heating unit; and/or
a laser light generated by the laser generating unit has a wavelength of 100 nm to 1500 nm.

8. A computer-readable medium having a program stored thereon, wherein the program, when being executed by a processor of a control unit, caused the processor to perform the additive manufacturing method according to claim 6.

9. The additive manufacturing method according to claim 6, wherein:
the generating the laser beam comprises: generating a point light spot and converting the point light spot into the linear light spot by a light spot converting device.

10. The additive manufacturing method according to claim 9, wherein:
the light spot converting device comprises:
an optical beam expanding system configured to one-dimensionally expand a laser beam generated by a laser into a linear beam;
an optical splitting and rearranging system configured to split and rearrange the laser beam expanded by the optical beam expanding system; and
a prismatic lens focusing system configured to focus a split and rearranged laser beam into the linear light spot by a prismatic lens.

11. The additive manufacturing method according to claim 6, wherein:
the linear light spot has a first dimension L and a second dimension W respectively in two directions perpendicular to each other on a projection plane parallel to the additive manufacturing platform, and a dimension ratio L/W of the first dimension L to the second dimension W ranges from 3 to 50.

12. The additive manufacturing method according to claim 11, further comprising:
changing, by a real-time operating device, a parameter of the linear light spot in real time during the additive manufacturing process.

13. The additive manufacturing method according to claim 12, wherein:
the real-time operating device is configured to control a real-time change of the parameter of the linear light spot based on slice model data of each material layer stored in a control unit, or based on the material, a thickness of the material layer or a laser power.

* * * * *